(12) United States Patent
Seferoglu et al.

(10) Patent No.: US 8,489,954 B2
(45) Date of Patent: Jul. 16, 2013

(54) METHOD AND APPARATUS FOR RELIABLE MEDIA TRANSPORT

(75) Inventors: Hulya Seferoglu, Irvine, CA (US); Ulas C. Kozat, Santa Clara, CA (US); M. Reha Civanlar, Istanbul (TR); James Kempf, Mountain View, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1005 days.

(21) Appl. No.: 12/508,420

(22) Filed: Jul. 23, 2009

(65) Prior Publication Data

US 2010/0058147 A1  Mar. 4, 2010

Related U.S. Application Data

(60) Provisional application No. 61/093,216, filed on Aug. 29, 2008.

(51) Int. Cl.
*H03M 13/00* (2006.01)
*G06F 11/00* (2006.01)

(52) U.S. Cl.
USPC ............................ 714/752; 714/776; 370/229

(58) Field of Classification Search
None
See application file for complete search history.

(56) References Cited

U.S. PATENT DOCUMENTS

| 7,248,564 | B1 | 7/2007 | Grosdidier et al. | |
|---|---|---|---|---|
| 7,333,431 | B2 | 2/2008 | Wen et al. | |
| 2003/0231589 | A1* | 12/2003 | Itoh et al. | 370/230 |
| 2004/0196860 | A1* | 10/2004 | Gao et al. | 370/437 |
| 2005/0160346 | A1* | 7/2005 | Yamane | 714/776 |
| 2006/0031738 | A1* | 2/2006 | Fay et al. | 714/758 |
| 2007/0086335 | A1* | 4/2007 | McCanne et al. | 370/229 |
| 2007/0165524 | A1* | 7/2007 | Mascolo | 370/230 |
| 2008/0192738 | A1* | 8/2008 | Florencio et al. | 370/389 |
| 2008/0225735 | A1* | 9/2008 | Qiu et al. | 370/252 |
| 2009/0092152 | A1* | 4/2009 | Rajakarunanayake et al. | 370/473 |
| 2010/0011116 | A1* | 1/2010 | Thornton et al. | 709/230 |
| 2010/0260180 | A1* | 10/2010 | Wu et al. | 370/390 |

OTHER PUBLICATIONS

Prasad, Ravi S., et al., "On the Effectiveness of Delay-Based Congestion Avoidance", PFLDnet Workshop, Feb. 2004, 2 pages.
Moon, Sue B., et al., "Correlation of Packet Delay and Loss in the Internet", Technical Report 98-11, Jan. 1998, 12 pages.

(Continued)

*Primary Examiner* — Albert Decady
*Assistant Examiner* — Justin R Knapp
(74) *Attorney, Agent, or Firm* — Blakely, Sokoloff, Taylor & Zafman LLP (57) ABSTRACT

Methods and apparatuses to model the relation between the delay samples and congestion losses and to protect media flows against congestion losses are disclosed. In one embodiment, the method comprises measuring congestion by delay samples, and performing a dynamic FEC algorithm that uses convex hull clustering for loss-event classification, including determining an FEC rate according to the loss-event classification. In another embodiment, the method comprises measuring congestion by delay samples, modeling loss events associated with the delay samples by grouping loss events as unions of convex hulls to identify a period of potentially increased congestion, dynamically changing the FEC rate based on the modeling, and applying FEC protection to the media flow during the period based on the FEC rate. In yet another embodiment, the method comprises forming clusters using past loss events and their $\{FTT, \dot{FTT}\}$ or $\{RTT, \dot{RTT}\}$ estimates, and estimating future loss events using most recent $\{FTT, \dot{FTT}\}$ or $\{RTT, \dot{RTT}\}$ estimates and their membership in convex hull clusters.

27 Claims, 7 Drawing Sheets

OTHER PUBLICATIONS

Bi, Jianping, et al., "Packet Delay and Packet Loss in the Internet", Proceedings of the Seventh International Symposium on Computers and Communications, 2002, 6 pages.

Bolot, Jean-Chrysostome, "Characterizing End-to-End Packet Delay and Loss in the Internet", Journal of High-Speed Networks, vol. 2, No. 3, Dec. 1993, pp. 305-323.

Borella, Michael S., et al., "Internet Packet Loss: Measurement and Implications for End-to-End QoS", Proceedings of International Conference on Parallel Processing, 1998, 10 pages.

Rubenstein, Dan, et al., "Detecting Shared Congestion of Flows Via End-to-End Measurement", IEEE/ACM Transactions on Networking, vol. 10, No. 3, Jun. 2002, pp. 381-395.

Brakmo, Lawrence S., et al., "TCP Vegas: New Techniques for Congestion Detection and Avoidance", IEEE/ACM Transactions on Networking, vol. 11, No. 3, 2003, pp. 356-369.

Wei, David X., et al., "Fast TCP: Motivation, Architecture, Algorithms, Performance", IEEE/ACM Transactions on Networking, vol. 14, No. 6, Dec. 2006, pp. 1246-1259.

Martin, Jim, et al., "Delay-Based Congestion Avoidance for TCP", IEEE/ACM Transactions on Networking, vol. 11, No. 3, Jun. 2003, pp. 356-369.

Futemma, Satoshi, et al., "TFRC-based Rate Control Scheme for Real-time JPEG 2000 Video Transmission", Proceedings of IEEE CCNC, 2005, pp. 110-115.

Wu, Huahui, et al., "A Model for MPEG with Forward Error Correction and TCP-Friendly Bandwidth", Proceedings of NOSSDAV '03, New York: ACM 2003, pp. 122-130.

Brockners, Frank, "The Case for FEC Fueled TCP-like Congestion Control", Kommunikation in Verteilten Systemen, 1999, pp. 250-263.

Martinian, Emin, et al., "Burst Erasure Correction Codes with Low Decoding Delay", IEEE Transactions on Information Theory, vol. 50, No. 10, Oct. 2004, 28 pages.

Huitema, C., "The Case for Packet Level FEC", Feb. 5, 1996, 13 pages.

Nguyen, Thinh, et al., "Distributed Video Streaming with Forward Error Correction", Proceedings of Packet Video Workshop, 2002, 12 pages.

Bolot, Jean-Chrysostome, et al., "Adaptive FEC-based Error Control for Internet Telephony", Proceedings of IEEE INFOCOM, 1999, pp. 1453-1460.

Park, Kihong, et al., "AFEC: An Adaptive Forward Error Correction Protocol for End-to-End Transport of Real-Time Traffic", Proceedings of IEEE IC3N, 1998, pp. 196-205.

Shokrollahi, Amin, "Raptor Codes", IEEE Transactions on Information Theory, vol. 52, No. 6, Jun. 2006, pp. 2551-2567.

Rhee, Injong, et al., "Limitations of Equation-based Congestion Control", SIGCOMM '05, Aug. 21-26, 2005, Philadelphia, Pennsylvania, USA, 12 pages.

Andren, Jonas, et al., "Understanding End-to-End Internet Traffic Dynamics", Proceedings of IEEE Globecom, 1998, pp. 1118-1122.

Handley, M., et al., "TCP Friendly Rate Control (TFRC): Protocol Specification", The Internet Society, 2003, 22 pages.

Bolot, Jean-Chrysostome, et al., "Adaptive FEC-Based Error Control for Internet Telephony", Proceedings of the, Eighteenth Annual Joint Conference of the IEEE Computer and Communications Societies, Mar. 21, 1999, pp. 1453-1460, vol. 3, New York, NY, USA.

Seferoglu, Hulya, et al., "Congestion State-Based Dynamic FEC Algorithm for Media Friendly Transport Layer", IEEE 17th International Packet Video Workshop, May 11, 2009, pp. 1-10, Piscataway, NJ, USA.

Futemma, Satoshi, et al., "TFRC-based Rate Control Scheme for Real-time JPEG 2000 Video Transmission", Second IEEE Consumer Communications and Networking Conference, Jan. 3, 2005, pp. 110-115, Piscataway, NJ, USA.

PCT International Search Report for PCT Patent Application No. PCT/US2009/054660, Dec. 30, 2009, 7 pgs.

PCT Written Opinion of the International Searching Authority for PCT Patent Application No. PCT/US2009/054660, Dec. 30, 2009, 9 pgs.

PCT International Preliminary Report on Patentability for corresponding PCT Patent Application No. PCT/US2009/054660, Mar. 10, 2011, 9 pgs.

* cited by examiner

METHOD AND APPARATUS FOR RELIABLE MEDIA TRANSPORT

PRIORITY

The present patent application claims priority to and incorporates by reference the corresponding provisional patent application Ser. No. 61/093,216, titled, "A Method and Apparatus for Reliable Media Transport," filed on Aug. 29, 2008.

FIELD OF THE INVENTION

The present invention relates to the field of media transport; more particularly, the present invention relates to classifying loss-events based on forming convex hull regions using RTT (or FTT) samples and their higher order derivatives and performing dynamic FEC based on loss event classification at a sender or receiver.

BACKGROUND OF THE INVENTION

Today, TCP is the dominant protocol (and it appears that it will remain so in the foreseeable future) for non-media and increasingly non-real-time media flows in the Internet. Although there are many different TCP variants, the fundamental TCP algorithm is the same: to secure as much bandwidth as possible while achieving some level of long-term rate fairness across competing flows. By their very design, both the widely employed loss based and delay-based TCP algorithms induce congestion to achieve rate adaptation. This leads to packet losses for other flows, including real-time media flows where losses cannot be concealed easily by the decoder. Thus, it is imperative to understand the negative impact of TCP on media flows and provide efficient countermeasures.

Standard transport layer solutions for media delivery such as TFRC mainly focus on TCP-friendly rate control, while leaving reliability to the application layer. The application layer has several means to increase reliability utilizing techniques such as forward error correction (FEC), retransmission, error-resilient source coding techniques, etc. FEC is preferred over the others in many scenarios such as multicasting (where feedback implosion may occur) and media transport over relatively large round trip time (RTT) distances (where late packet arrivals are treated as packet losses at the application layer). Congestion-induced packet losses may occur as the result of longer term congestion conditions or they may occur as brief periods of congestion triggered by TCP's additive increase/multiplicative decrease bandwidth sensing algorithm.

Loss and delay statistics and the relationship between network congestion and RTT or FTT delays observed by the end hosts in the Internet has long been the subject of various studies. For example, measurements for the period of Jul. 23, 2008-Aug. 22, 2008 indicate that packet loss on the global Internet is more than 2% on average. In separately analyzing loss and delay, some have concluded that most loss events occur in bursts of 1 or 2 losses and the inter-separation of loss events is typically large, rendering FEC-based protection a viable approach. Others, in looking at a month of statistics on packet losses in the Internet measured from speech flows (following ITU G.723.1 recommendation), determined that in most cases a current loss indicates another loss in the near future, although in many cases the correlation is weak. The losses are typically asymmetric, e.g., they mostly occur either in one direction or the other, but not both. Still others have observed that when a flow is sparse enough (e.g., audio and lower quality video), the losses look random and FEC-type open-loop solutions become more attractive. Looking into both the autocorrelation of packet delays and the cross-correlation between packet loss and delay observed by a continuous media stream, some have observed that delay auto-correlation in most cases decreases as the lag between the samples increase. Interestingly, some also observed periodicity in autocorrelation of some traces which they attribute to a synchronization phenomenon between TCP flows. Some analysis on loss-conditioned average delay indicates a large delay correlation around the loss event, i.e., packets that were queued just before or after the loss event tend to observe similar queuing delays. Others have found that the distribution characteristics of RTT and loss rate are inter-dependent, i.e., at small loss rates, the RTT distribution exhibits mostly a unimodal curve, whereas at higher loss rates it becomes more spread and multiple significant local maxima develop.

The interdependence of network congestion and RTT has been used as the main design philosophy of many TCP variants that are categorized as delay-based congestion control algorithms. Critique of these protocols claim that delay-based congestion control is not an adequate technique. Particularly, some argue that unless the RTT sampling rate is fast enough (e.g., in high bandwidth paths), delay-based methods react to RTT variations incorrectly leading to poor performance. Similar observations and more detailed evaluation indicate weak correlation between RTT value increases and packet losses.

The losses in a real network can be due to many reasons including congestion, interface/router failures, buggy protocol implementations, channel errors (mainly over the last mile links), etc. Even when congestion is the main reason for packet losses, in most of the measurement studies, it is not clear whether the losses are due to flash-crowds or induced congestion from aggressive rate/congestion control protocols.

Previously, congestion states have been tied to the level of FEC protection. For example, congestion losses have been modeled with a two-state Gilbert model and it has been determined that the redundant information needed to be piggy backed at each new voice packet. A heuristic loss prediction algorithm has been proposed which is based on the ratio of long-term RTT to short term RTT and improves the rate adaptation algorithm of TFRC to cut the rate when future loss events are predicted. The TFRC rate equation has been used as a rate constraint and to jointly optimize source coding and FEC level based on that constraint. A fixed FEC has been added into the control loop of TCP's additive increase multiplicative decrease (AIMD) algorithm such that the multiplicative rate reduction due to losses is applied only after the FEC decoding stage fails.

SUMMARY OF THE INVENTION

Methods and apparatuses to model the relation between the delay samples and congestion losses and to protect media flows against congestion losses are described. In one embodiment, the method comprises measuring congestion by delay samples, and performing a dynamic FEC algorithm that uses convex hull clustering for loss-event classification, including determining an FEC rate according to the loss-event classification. In another embodiment, the method comprises measuring congestion by delay samples, modeling loss events associated with the delay samples by grouping loss events as unions of convex hulls to identify a period of potentially increased congestion, dynamically changing the FEC rate based on the modeling, and applying FEC protection to the media flow during the period based on the FEC rate. In yet another embodiment, the method comprises forming clusters using past loss events and their {FTT, FṪT} or {RTT, RṪT} estimates, and estimating future loss events using most recent {FTT, FṪT} or {RTT, RṪT} estimates and their membership in convex hull clusters.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In one embodiment, a low overhead, TCP-friendly algorithm utilizing FEC on unicast media flows is used to more effectively handle congestion-induced packet losses. In the following, two FEC-based reliable transport techniques are disclosed, one sender-based and the other receiver-based, that dynamically change the FEC rate based on modeling the congestion-induced packet losses. The modeling acts on the interdependencies between packet losses and the two-tuple that consists of RTT (or FTT) and its derivative RṪT (or FṪT). In one embodiment, these interdependencies are modeled by grouping the loss events as unions of convex hulls on a 2-D Euclidean space, where each loss event is associated with a two-tuple {RTT, RṪT} (or {FTT, FṪT}). The disclosed techniques can substantially reduce the overhead from FEC while achieving the same level of reliability a fixed-rate FEC would provide.

In one embodiment, the TCP Friendly Rate Control (TFRC) protocol is combined with Forward Error Correction (FEC). Thus, TFRC is used as the baseline protocol. TFRC is an equation based rate control protocol that targets generating a long-term throughput similar to a TCP flow, while attaining much lower rate fluctuations.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Figure 1:
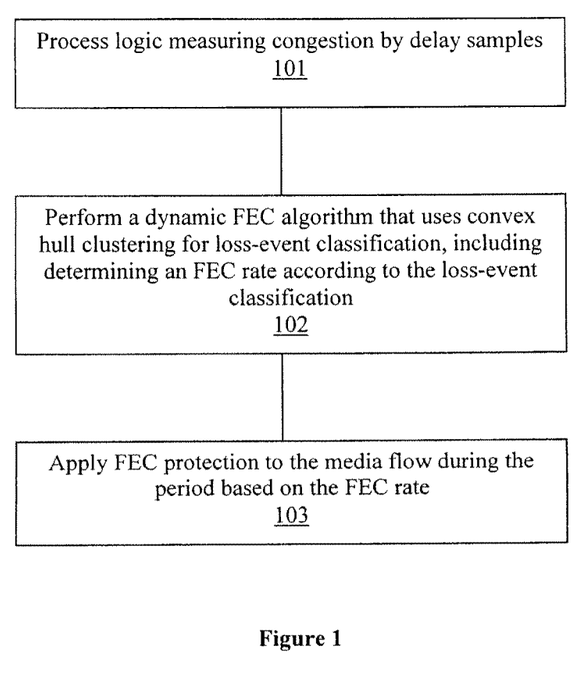
FIG. 1 is a flow diagram of one embodiment of a process for protecting media flows against congestion losses.

FIG. 1 is a flow diagram of one embodiment of a process for protecting media flows against congestion losses. The congestion losses may be generated by TCP-like traffic. The process is performed by processing logic that may comprise hardware (e.g., circuitry, dedicated logic, etc.), software (such as is run on a general purpose computer system or a dedicated machine), or a combination of both. In one embodiment, the process is performed by a sender in a network.

Referring to FIG. 1, the process begins by processing logic measuring congestion by delay samples (processing block 101). In one embodiment, the delay samples comprise RTT samples taken at a sender. In another embodiment, the delay samples comprise FTT samples taken at a receiver.

Next, processing logic performs a dynamic FEC algorithm that uses convex hull clustering for loss-event classification, including determining an FEC rate according to the loss-event classification (processing block 102). In one embodiment, performing the dynamic FEC algorithm comprises dividing a time-horizon into FEC frames and determining the FEC rate based on at least one of a group consisting of: (1) an FTT sample and its derivative and (2) an RTT sample and its derivative. In one embodiment, the loss-event classification is performed by a classifier based on RTT values obtained at a sender. In another embodiment, the loss-event classification is performed by a classifier based on FTT values obtained at a receiver.

In one embodiment, performing a dynamic FEC algorithm comprises modeling loss events associated with the delay samples by grouping loss events as unions of convex hulls to identify a period of potentially increased congestion, and dynamically changing the FEC rate based on the modeling. In one embodiment, modeling loss events associated with the delay samples comprises determining whether RTT sequences or FTT sequences are in an increasing or decreasing region, above or below a threshold, at a local minima. This may include classifying loss events based on FTT or RTT derivatives. In one embodiment, modeling loss events associated with the delay samples comprises constructing regions using a convex-hull based clustering algorithm, where the union of the regions covers all corresponding loss events. In one embodiment, constructing regions comprises performing cluster separation over a domain; and applying convex hull modeling of each cluster. In one embodiment, the domain comprises one of a RTT or FTT domain. In one embodiment, cluster separation is performed using a loss event histogram over the domain.

After determining a rate, processing logic applies FEC protection to the media flow during the period based on the FEC rate (processing block 103). In one embodiment, applying FEC protection to the media flow comprises applying erasure coding during the period.

Interdependence of TCP-Induced Loss to RTT/FTT

Techniques described herein exploit a relation between the packet losses specifically induced by TCP flows and the most recent RTT/FTT samples taken at the TFRC sender/receiver before the losses. For purposes herein, the times when a TFRC flow observes packet losses $\{l(1), l(2), l(3), \ldots\}$ are denoted as $\{\hat{t}_1, \hat{t}_2, \hat{t}_3, \ldots\}$ and the RTT and FTT samples obtained just before the losses at the TFRC sender and receiver are denoted as $\{\tilde{RTT}(\hat{t}_1), \tilde{RTT}(\hat{t}_2), \tilde{RTT}(\hat{t}_3), \ldots\}$ and $\{\tilde{FTT}(\hat{t}_1), \tilde{FTT}(\hat{t}_2), \tilde{FTT}(\hat{t}_3), \ldots\}$, respectively.

In a network where TCP and TFRC flows coexist, flows arrange their rates according to loss events and/or estimated RTTs. For TFRC, the rate in bytes per second is computed by the equation:

$$R_{tfrc} = \frac{s}{\overline{R} \cdot [\sqrt{2p/3} + 12\sqrt{3p/8} \cdot p \cdot (1 + 32p^2)]}$$

where s is the segment size in bytes, $\overline{R}$ is the low-pass filtered average of RTT samples, and p is the probability estimate of loss events. TCP, on the other hand, uses window based rate control and more recently it has been shown that different TCP flavors behave according to the following differential equation:

$$\dot{\omega}_i(t) = \kappa_i(\omega_i(t), \overline{R}(t)) \cdot \left(1 - \frac{q_i(t)}{u_i(\omega_i(t), \overline{R}(t))}\right)$$

where w is the average window of i-th flow, $\kappa_i$ is the choice of gain function that determines the dynamic properties such as stability and responsiveness, $u_i$ is the marginal utility function that determines equilibrium properties such as long-term rate and fairness, and $q_i$ is the congestion measure limited to loss probability or queueing delay. Note that increasing w increases the flow rate for TCP. When $q_i$ is loss-based, the TCP increases the congestion window linearly in $\overline{R}$. When a loss occurs, TCP ramps down the rate and again follows a linear increase (ignoring the rate region before the slow-start threshold). When $q_i$ is delay-based, TCP increases the congestion window more aggressively when $\overline{R}$ is closer to the minimum observed RTT and becomes less aggressive at higher $\overline{R}$, eventually decreasing the rate when $\overline{R}$ is higher than a threshold.

Given these rate control algorithms, TFRC maintains a steady flow by smoothing the flow rate, whereas long-lived TCP grabs more and more bandwidth thereby inducing congestion which is then observed, causing a backoff to remove the congestion. Since TCP increases the flow rate steadily, the queue at a bottleneck link will build up. Thus, a TFRC sender will sample this build up every $\overline{R}$ seconds (assuming the receiver side sends explicit feedback about every $\overline{R}$ seconds), and a TFRC receiver can sample it with every received packet.

Suppose the i-th packet is sent by the TFRC sender with a time stamp $t_{snd,i}^s$ feedback for i is sent back by the receiver after some delay $\tau^{proc}$, and the feedback is received by the sender at $t_{snd,i}^r$. Then, for the i-th packet, the sender has a sample of the RTT:

$$RTT(i) = t_{snd,i}^r - t_{snd,i}^s - \tau^{proc} = \tau_f^p + \tau_r^p + \tau_f^q + \tau_r^q + \tau_i^{srv}$$

Here, assuming subsequent packets in each direction follow the same path, propagation delays in the forward ($\tau_f^p$) and reverse ($\tau_r^p$) directions are constants. If subsequent packets have the same size, it is assumed that the overall service time at intermediate nodes ($\tau_i^{srv}$) is constant as well. Queuing delays in the forward ($\tau_f^q$) and reverse ($\tau_r^q$) directions, on the other hand, vary depending on the flow dynamics in each direction. Accordingly, whenever the network congestion is observed in the forward direction, RTT(i) samples the congestion for the media flow more accurately provided that the feedback frequency is fast enough. Suppose, packets i+1 to i+j are lost in a burst of j packets corresponding to loss events l(k+1), . . . , l(k+j), then the round trip times are $\tilde{RTT}(\hat{t}_{k+1}) = \ldots = \tilde{RTT}(\hat{t}_{k+j}) = RTT(i)$.

From the receiver's point of view, for each i-th packet received, a forward trip time estimate is given by:

$$FTT(i) = t_{rcv,i}^r - t_{snd,i}^s = \tau_f^p + \tau_f^q + \tau_i^{srv} + \Phi(i)$$

In contrast to the RTT estimates, there is a clock offset $\Phi(i)$ between the sender and receiver. If the clock drift is very small, the offset can be treated as constant in this analysis. Note that the frequency of the FTT(i) samples depends on the flow rate and there is a higher sampling rate for queuing delays with higher quality, more bandwidth intensive videos. Similar to the sender based operation, when packets i+1 to i+j are lost in a burst of j packets corresponding to loss events l(k+1), . . . , l(k+j), then the forward trip times are $\tilde{FTT}(\hat{t}_{k+1}) = \ldots = \tilde{FTT}(\hat{t}_{k+j}) = FTT(i)$.

Figures 2, 3A:
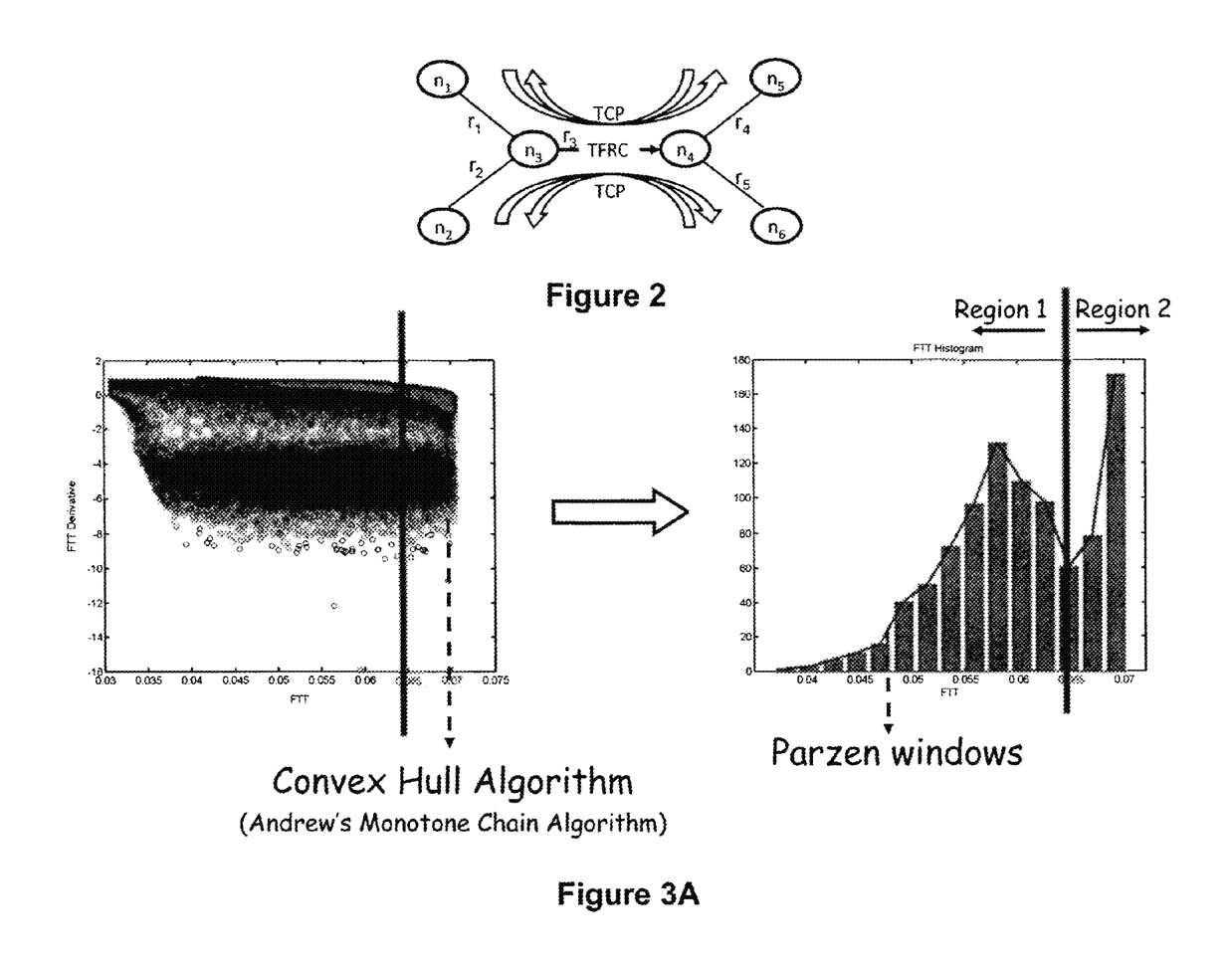
FIG. 2 shows a network having a number of nodes.
FIG. 3A illustrates loss events are shown as light circles in all plots whereas the events corresponding to received packets are shown by dark circles.

FIG. 2 shows a network having a number of nodes n. Note that there may be more or less nodes. Referring to FIG. 2, $n_1$ and $n_2$ transmit multiple TCP flows to $n_5$ and $n_6$, respectively, while $n_3$ transmits a TFRC flow to $n_4$. $\{r_1, r_2, r_3, r_4, r_5\}$ is the set of transmission data rates of the links. The link between $n_3$ and $n_4$ is the bottleneck link.

RTT(i) and FTT(i) sequences may be plotted as functions of $t_{snd,i}^r$ and $t_{rev,i}^r$ while the circles plot $R\tilde{T}T(\hat{t}_k)$ and $F\tilde{T}T(\hat{t}_k)$ sequences as functions of $\hat{t}_k$. In this scenario, the bottleneck link has 10 Mbps capacity and is shared by 10 TCP-SACK and 1 TFRC flows. Most loss events are in the increasing region of the RTT(i) and FTT(i) graphs. This is also intuitive, because increasing RTT and FTT values imply that the buffers in the intermediate nodes are building up; hence any loss event is near. Losses are barely seen in the decreasing region of RTT(i) and FTT(i) graphs, which is intuitive since congestion is relieved in those epochs. However, a significant number of errors occur at local minima in RTT(i) and FTT(i) graphs.

Relation of Loss to RTT/FTT and the Derivative of RTT/FTT

RTT(i) and FTT(i) sequences indicate that loss events can be classified at a finer level by observing whether at time t, the RTT(i) or FTT(i) sequence is in an increasing or decreasing region, above or below a threshold, at a local minima, etc. The sequence of two tuples $\{RTT(i), R\dot{T}T(i)\}$ and $\{FTT(i), F\dot{T}T(i)\}$ actually better classify packet loss events. In one embodiment, both $R\dot{T}T(i)$ and $F\dot{T}T(i)$ are computed as follows:

$$R\dot{T}T(i)=(RTT(i+m)-RTT(i))/(t_{snd,i+m}^s-t_{snd,i}^s)$$

$$F\dot{T}T(i)=(FTT(i+m)-FTT(i))/(t_{rev,i+m}^r-t_{rev,i}^r)$$

where i and i+m are two consecutive RTT or FTT samples. Suppose packets i+1 to i+j are lost in a burst of j packets corresponding to loss events l(k+1), ..., l(k+j). We further define:

$$R\dot{T}T(\hat{t}_k)=R\dot{T}T(i) \text{ and } F\dot{T}T(\hat{t}_k)=F\dot{T}T(i)$$

To help visualize the relation between loss events and the two-tuples $\{RTT(i), R\dot{T}T(i)\}$ and $\{FTT(i), F\dot{T}T(i)\}$, a 2-D view is used where the x-axis represents RTT (or FTT) values and y-axis represents $R\dot{T}T$ (or $F\dot{T}T$) values for both received and lost packets. FIG. 3A illustrates loss events are shown as light circles in all plots whereas the events corresponding to received packets are shown by dark circles.

Referring to FIG. 3A, there is a large fraction of loss events where a negative derivative value is observed, i.e., a decrease in RTT or FTT value does not in general imply that congestion has vanished. Along the FTT dimension only, one can more efficiently classify the loss events than along the RTT dimension or using both $\{RTT, R\dot{T}T\}$, primarily due to the much higher sampling rate. On the other hand, the best accuracy is obtained if $\{FTT, F\dot{T}T\}$ is used to estimate loss events because loss events are tightly clustered. There is a strong relationship between loss events and $\{RTT, R\dot{T}T\}$, $\{FTT, F\dot{T}T\}$ tuples for this simple topology under different scenarios.

For more complicated topologies, such as two-way traffic over a single-bottleneck topology (as in FIG. 2) and one-way traffic over a two-bottleneck topology, $\{FTT, F\dot{T}T\}$-based loss classification can still provide a relatively very compact region for identifying the potential occurrence of loss events. That is, $\{FTT, F\dot{T}T\}$ continues to serve as a good classifier allowing loss events to be represented by a relatively compact set. Heuristic algorithms can be used to classify the potential for loss events using $\{FTT, F\dot{T}T\}$ and $\{RTT, R\dot{T}T\}$ estimates.

Although $\{RTT, R\dot{T}T\}$ performs adequately only for the scenarios where the topology has a single bottleneck and congestion occurs in the forward direction only, these conditions are not very limiting for the Internet. Therefore, it is still worthwhile to develop online classifiers over the $\{RTT, R\dot{T}T\}$ estimates.

Convex-Hull Based Classification of Loss Events

When there is a correlation between loss events and $\{RTT, R\dot{T}T\}$ and/or $\{FTT, F\dot{T}T\}$ tuples, loss events are typically clustered in a specific region that can be bounded by compact sets over $\{RTT, R\dot{T}T\}$ and/or $\{FTT, F\dot{T}T\}$ domains. In one embodiment, a convex-hull based clustering algorithm is used to construct compact regions, the union of which covers all the point corresponding to the loss events, i.e., all points, of loss sequences $\{R\tilde{T}T(\hat{t}_k), R\tilde{\dot{T}}T(\hat{t}_k)\}$ and $\{F\tilde{T}T(\hat{t}_k), F\tilde{\dot{T}}T(e,\text{cir } t_k)\}$. In another embodiment, a certain percentage (e.g., 1%) of outlier points at the vertices of convex hull are removed from the loss events constructing a more compact region. Dynamic FEC algorithms use this clustering algorithm as a loss-event classifier. In one embodiment, the dynamic FEC algorithm divides the time-horizon into FEC frames, and decides how many source and parity blocks will be transmitted in the current FEC frame (i.e., determines the coding rate) based on the most recent $\{RTT(i), R\dot{T}T(i)\}$ (or $\{FTT(i), F\dot{T}T(i)\}$) sample. To facilitate the decision on the coding rate, individual loss events observed in $\Delta_{FEC}$ duration are grouped together and categorized uniquely as 1-loss, 2-loss, 3-loss, etc. events. Suppose an m-loss event has l(k) as the first packet lost, then $\{R\tilde{T}T(\hat{t}_k), R\tilde{\dot{T}}T(\hat{t}_k)\}$ (or $\{F\tilde{T}T(\hat{t}_k), F\tilde{\dot{T}}T(\hat{t}_k)\}$) is used to represent this particular loss event. For each m-loss event, then separate (and typically overlapping) compact regions are computed. The dynamic FEC algorithm then checks whether the most recent $\{RTT(i), R\dot{T}T(i)\}$ (or $\{FTT(i), F\dot{T}T(i)\}$) sample is in any of these compact regions and picks the highest m as the parity number (e.g., say the most recent $\{RTT(i), R\dot{T}T(i)\}$ value belongs to both 1-loss and 3-loss regions, then FEC algorithm decides to use 3 parity blocks). The methods described herein to model loss regions are applied to each m-loss event separately in the same fashion.

The coding overhead of FEC then is directly related to the ratio of no-loss events that fall onto the regions classified as lossy regions. Therefore, the objective of the clustering algorithm is to as tightly bound the lossy regions as possible.

In one embodiment, cluster separation is performed over RTT (or FTT) domain before applying convex hull modeling of each cluster. In one embodiment, cluster separation is performed using a loss event histogram over RTT or FTT domains.

In one embodiment, since the histogram does not have a value at each RTT (or FTT) value, smoothing and interpolation is performed using Parzen windows. Parzen windows based estimation of n sample distribution are given as;

$$P_n(x) = \frac{k_n/n}{V_n}$$

where $V_n$ is the hypercube (line segment in our case) centered in x and $k_n$ is the number of samples in this hypercube. One can fix either $V_n$ or $k_n$ to compute the other. In one embodiment, $k_n=\sqrt{n}$ is used in the algorithm, which is also known as $k_n$ nearest neighbor estimator. After filtering with Parzen windows, all local minima and corresponding RTT, FTT values are determined in a manner well-known in the art. The region k is defined between two consecutive local minimums as a new region $\mathcal{R}_k$. In other embodiments, other smoothing and interpolation techniques can be used in place of Parzen windows.

FIG. 3A illustrates a map of {FTT, FṪT} tuples and an FTT histogram created from the map. Parzen windows are shown in FIG. 3A and are used to create regions having a local minima.

In one embodiment, in order to find convex hull of each region, the implementation in K. Clarson, "A Short, Complete Planar Convex Hull Code," http//plan9.bel-labs.com/who/clarkson/2dch, is used, which is similar to the Andrew's Monotone Chain Algorithm, "Another Efficient Algorithm for Convex Hulls in Two Dimensions," Info. Proc. Letters, Vol. 9, pp. 216-219, 1979. In this algorithm, points are sorted lexicographically (first by x-coordinate, and in case of a tie, by y-coordinate), and then upper and lower hulls of the points are constructed. The algorithm runs in O(n log n) time.

Since the TFRC sender (receiver) does not have any initial RTT (or FTT) sample and loss regions are monotonically non-decreasing, in one embodiment, the following online procedure is used to construct convex hulls. An initial time interval is reserved as a learning period in which {RTT, RṪT} (or {FTT, FṪT}) pairs as well as loss events are collected in a data structure. The learning period is further divided into two periods. At the end of the first period, region partitioning is done for loss events, and for each region $\mathcal{R}_k$, a new data structure is constructed. In the second period, when a new loss event is labeled as in the lossy region $\mathcal{R}_k$, the convex hull algorithm described above is run, corner points ($I_c(k)$) and its area ($A_c(k)$) of the convex hull are calculated and recorded. If this new point is inside the current convex hull, neither $I_c(k)$ nor $A_c(k)$ changes. If the point is outside of the convex hull, $I_c(k)$ changes and $A_c(k)$ increases. The algorithm also records the last $W_c(k)$ increases of the convex hull area. The max value of $W_c(k)$ vector is also calculated as $\delta_c(k)$ and is used in real time.

After the learning period, the algorithm operates in two phases: data query and data collection. In data query phase, the algorithm makes a decision on whether the most recent {RTT, RṪT} (or {FTT, FṪT}) tuple is in the convex hull of one of the regions. In one embodiment, the algorithm determines its region at first considering RTT or FTT. If its region is $\mathcal{R}_k$, a determination is made as to whether the addition of this point to $I_c(k)$ would lead to a convex hull area less than $A_c(k)+\kappa\delta_c(k)$. If so, the point is added to $I_c(k)$ and convex hull is updated. Furthermore, an FEC decision is performed at this point. Otherwise, the convex hull remains the same. Note that in one embodiment, $\kappa\delta_c(k)$ is used as the guard band. The reason of this choice is that even after learning period convex hulls may keep increasing, $\kappa$ is the over-provisioning factor that can be decided according to media requirements. The data collection phase, on the other hand, continues to record {RTT, RṪT} (or {FTT, FṪT}) pairs as well as loss events and periodically checks whether a new partitioning and/or convex hull computation is needed.

Figure 3B:
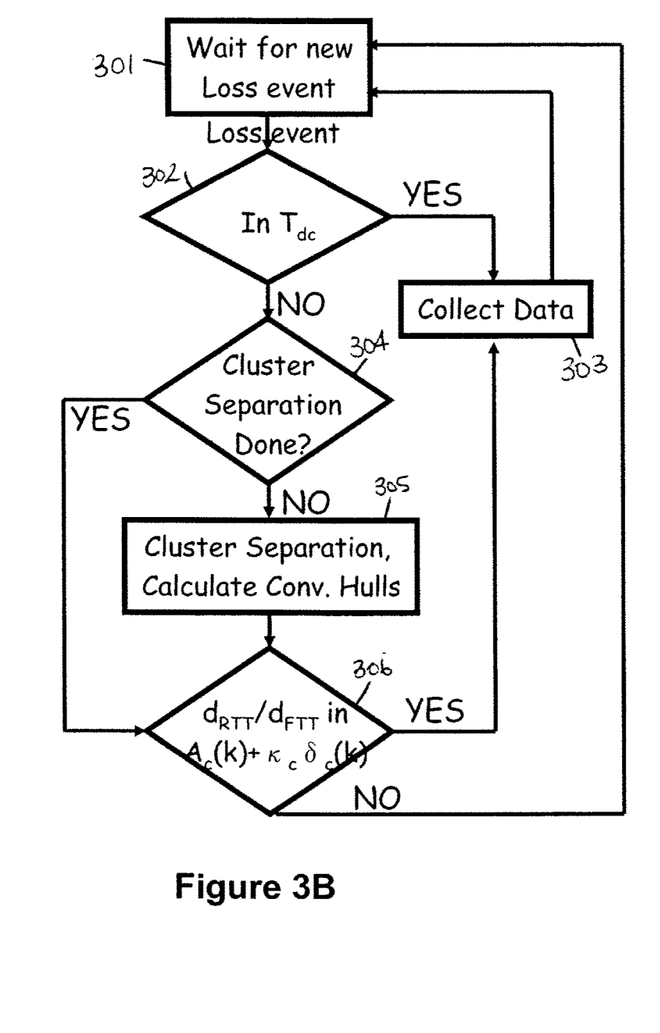
FIG. 3B is a flow diagram of one embodiment of an online clustering process.

FIG. 3B is a flow diagram of one embodiment of an online clustering process. The process is performed by processing logic that may comprise hardware (e.g., circuitry, dedicated logic, etc.), software (such as is run on a general purpose computer system or a dedicated machine), or a combination of both. The online clustering process may be performed by a sender or a receiver.

Referring to FIG. 3B, the process begins by processing logic waiting for a new loss event (processing block 301). In response to a new loss event, processing logic tests whether the loss event occurs in the data collection learning phase (processing block 302). If it does, the process transitions to processing block 303 where the data is collected, and the process transitions to processing block 301 where the process is repeated.

If the loss event does not occur in the data collection learning phase, processing logic determines whether the cluster separation has been performed (processing block 304). If it has not, processing logic performs the cluster separation and calculates the convex hulls (processing block 305) and the process transitions to processing block 306. If processing logic determines that the cluster separation has been done at processing block 304, processing logic transitions directly to processing logic 306.

At processing block 306, processing logic determines whether the RTT (or FTT if it is being used in place of RTT) and derivatives corresponding to the loss event are within the guard band of the convex hull area of region K. If it is, the process transitions to processing block 303 where processing logic collects the data. If not, processing logic transitions to processing block 301 where the process is repeated.

Now that the algorithm to estimate whether a loss event will occur has been defined, sender-based and receiver-based FEC process are described below.

Dynamic FEC Extended TFRC Algorithms

Embodiments of the invention include two FEC algorithms: a sender-based FEC algorithm and a receiver-based FEC algorithm.

A Sender-Based Implementation

In one embodiment, the sender-based FEC algorithm uses the relationship between loss events and {RTT, RṪT} tuples at the sender. A TFRC receiver sends back a report on the loss events and acknowledges the most recently received packet after each average RTT period. The sender estimates its most recent RTT according to this report. In one embodiment, the sender-based FEC algorithm determines its FEC rate according to the loss-event classification based on these RTT values as described above. One embodiment of the sender-based FEC algorithm is described as follows.

TFRC begins with slow-start phase until it can start using its equation based rate given by (1) above. In this phase, TFRC rate and its estimated RTT are not reliable for future loss event estimates. Therefore, during this period, the FEC algorithm described herein uses a predefined FEC block size and FEC rate. Typically, the FEC rate is chosen high in this phase to avoid packet drops. After the slow-start phase, a learning phase begins. In one embodiment, the learning phase consists of two parts: data collection and FEC rate selection.

At the beginning of the learning phase, the FEC block size (i.e., $\Delta_{FEC}$) is determined. In one embodiment, the block size is set to the mean RTT estimate of TFRC sender. After this point, the sender-based FEC algorithm begins to collect statistics of different loss types such as a RTT estimate at the beginning of an FEC block and the number of packet drops in an FEC block as explained above. In one embodiment, the FEC rate selection in the learning phase is divided into two periods. In the first period, high FEC rates are used to avoid any possible packet losses. In the second period, a RTT thresholding algorithm is used to determine FEC rates. In one embodiment, the RTT thresholding algorithm finds a minimum RTT value for each loss event category (e.g., 2-loss event) over which particular loss events (e.g., 2 losses in an FEC block) are seen. Note that, in this period, FEC rate selection depends only on RTT delay and loss event maps.

After the learning phase, the sender-based FEC algorithm determines different clustering regions and corresponding clusters. In this period, at the beginning of each FEC block (at time $t_0$), the last RTT(i) value is mapped to the FEC block. At this point, since RTT(i+1) is not known, the derivative of the last RTT(i) value, namely $\dot{\text{RTT}}(i)$ is set equal to zero. According to the location of this point ({RTT(i), $\dot{\text{RTT}}(i)$}), the FEC coding rate is tentatively assigned to this FEC block and the number of source and parity packets are determined. The transmitted source packets are also cached in the sender. While transmitting source packets, if a new report is received from the receiver—and if its RTT estimate changes—a derivative, $\dot{\text{RTT}}(i)$, is calculated. Now, the {RTT(i), $\dot{\text{RTT}}(i)$} pair is checked one more time to determine to which clustering region that they belong. According to this information, the FEC rate and hence the number of source packets and parities are updated. In one embodiment, the FEC block size is set to the mean RTT value, which is updated by each feedback packet according to the TFRC's mean RTT computation.

When source packets are received by the receiver, they are directly passed to the application layer but their copies are cached at the TFRC receiver. When a timeout passes after the receive time of the last packet from an FEC block, FEC decoding begins. If all source packets are received, there is no need to decode packets. However, if one or more of the source packets are missing, these can be recovered if a sufficient number of source and parity packets has been received. This sufficient number depends on the particular erasure code that has been used, e.g., Raptor codes, Tornado Codes, Reed-Solomon codes have different coding efficiencies. Then, decoded packets are passed to the application.

Figure 4:
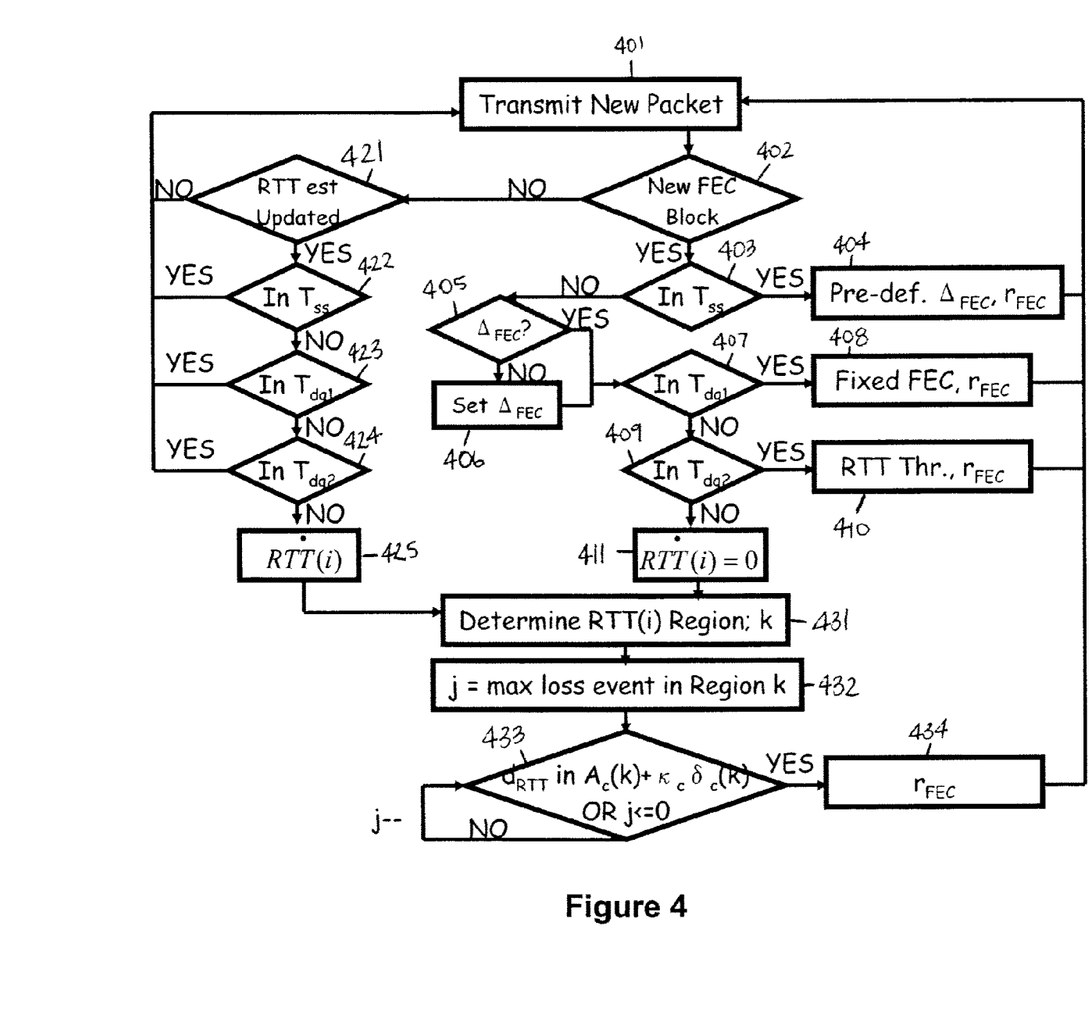
FIG. 4 is a flow diagram of one embodiment of a sender-based dynamic FEC process.

FIG. 4 is a flow diagram of one embodiment of a sender-based dynamic FEC process. The process is performed by processing logic that may comprise hardware (e.g., circuitry, dedicated logic, etc.), software (such as is run on a general purpose computer system or a dedicated machine), or a combination of both. In one embodiment, the process is performed by a sender in a network.

Referring to FIG. 4, the process begins by processing transmitting a new packet (processing block 401). In response to transmitting the new packet, the process determines whether a new FEC block exists (processing block 402). If it does not, the process transitions to processing block 424 where processing logic tests whether the RTT estimate has been updated. If it has not, the process transitions to processing block 401 where the process repeats. If it has, then processing logic tests whether the new packet is in the slow start phase ($T_{ss}$) and the process transitions to processing block 401 where the process repeats itself. If not, the process transitions to processing block 423 where processing logic tests whether the new packet is transmitted during the first data collection phase ($T_{dq1}$). If it is, the process transitions to processing block 401 where the process repeats. If not, the process determines whether the new packet is in the second data collection phase ($T_{dq2}$) (processing block 424). If it is, the process transitions to processing block 401 and the process repeats itself. If not, processing logic determines the derivative of the round trip time (RTT)(i) and transitions to processing block 431.

If processing logic determines the transmitted new packet is in a new FEC block at processing block 402, then the process transitions to processing block 403 where the process determines whether the new packet is transmitted into the $T_{ss}$ phase. If it is, processing logic uses a predefined FEC block size (e.g., 20 blocks) (processing block 404) and transitions to processing block 401 where the process repeats itself. If the process is not in the $T_{ss}$ phase, then processing logic determines whether the FEC block size is to be changed (processing block 405). If it is, processing logic transitions to processing block 407. If not, processing logic sets the FEC block size (processing block 406) and the process transitions to processing block 407.

At processing block 407, the process determines the transmitted new packet is in the first stage collection phase. If it is, processing logic uses the fixed FEC in this (processing block 408) and transitions to processing block 401. If not, processing logic determines whether the transmitted new packet is in the second data collection phase (processing block 409). If it is, processing logic uses a round trip time (RTT) threshold (processing block 410) and the process transitions to processing block 401 where the process is repeated. If not, processing logic sets the derivative of RTT equal to zero (processing block 411) and the process transitions to processing block 431.

At processing block 431, processing logic determines the RTT(i) region K. Thereafter, processing logic sets the variable j equal to the maximum loss event in region K (processing block 432) and the process transitions to processing block 433.

At processing block 433, processing logic determines whether the derivative of RTT occurs within a guard band amount of the convex hull area region K. That is, in one embodiment, processing logic determines whether the derivative for the RTT that corresponds to loss event is the convex hull area of region K or whether the variable j is less than or equal to zero. If not, the process returns or feeds back to processing block 433. If it is, processing logic uses the $r_{FEC}$ (processing block 434) and the process transitions to processing block 401.

A Receiver Based Implementation

Figure 6:
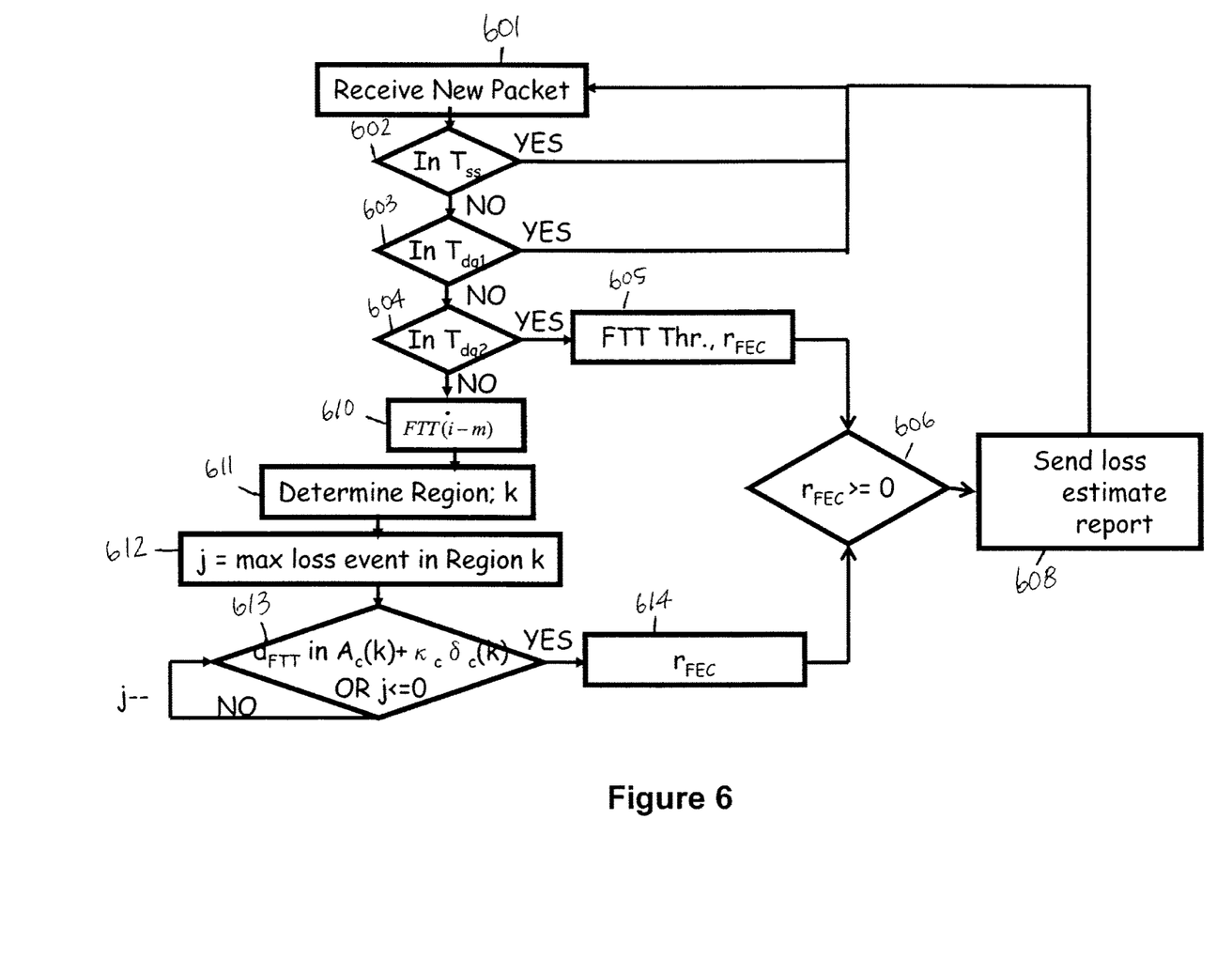
FIG. 6 is a flow diagram of one embodiment of a process to report loss estimates at the receiver as part of a receiver based dynamic FEC process.

In one embodiment, the receiver based FEC algorithm considers the relationship between loss events and {FTT, $\dot{\text{FTT}}$} tuples. The flow of the algorithm is similar to the sender based implementation. FIG. 6 shows the flow diagram of how the FEC rate is determined at the receiver. Before the beginning of the learning phase, the FEC block size is determined. When learning phase begins, {FTT, $\dot{\text{FTT}}$} pairs and their corresponding loss events are collected. During both initialization and learning phases high FEC rates are used to avoid packet losses. In the second period of the learning phase, the FTT thresholding algorithm runs. The FTT thresholding algorithm is similar to the RTT thresholding algorithm. Specifically, the minimum FTT corresponding to each loss event category (e.g., 2-loss event) is determined and if the current FTT is higher than this minimum FTT, a loss event is reported to the sender. If an FTT(i) sample is above this threshold, the receiver sends immediate feedback to the TFRC sender that contains the loss-event category and the sequence number of the FEC block in which receiver estimates any possible loss. When the sender receives this report, it generates a number of parities equal to the reported loss category. Note that the sender does not send any parities if it does not receive any report that indicates any possible loss in that FEC block.

After the learning phase, the convex hull based algorithm described above starts working. If the {FTT, $\dot{\text{FTT}}$} tuple is considered in a lossy region, again the loss event category and the FEC block sequence number are sent back to the sender immediately. As in the FTT thresholding algorithm, the sender transmits parities for that FEC block upon receiving such a report and after all the source packets of the block are sent out. The decoding part of this algorithm is the same as the sender based implementation.

Figure 5:
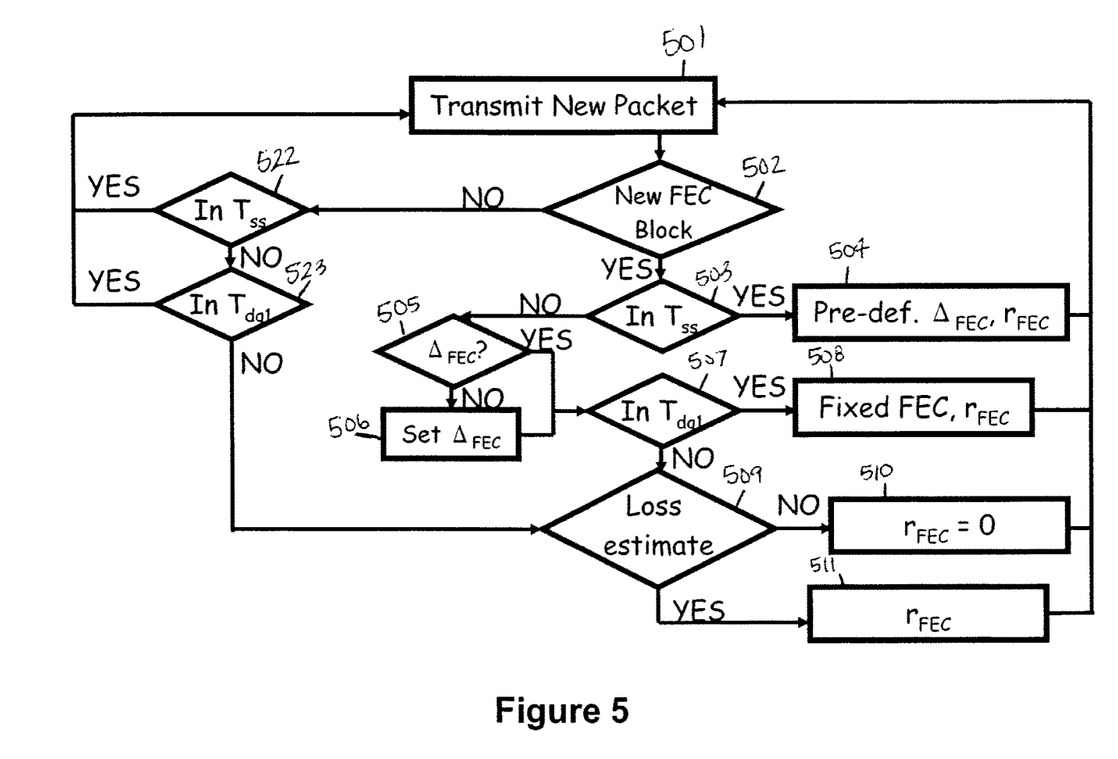
FIG. 5 is a flow diagram of one embodiment of a receiver based dynamic FEC process.

FIG. 5 is a flow diagram of one embodiment of how sender behaves in a receiver based dynamic FEC process. Actual FEC rate selection and parity block generation occurs at the sender based on the received feedback when the learning phase is completed. Thus, once the receiver classifies and determines the loss estimate, this needs to be fed back to the sender to enable the sender to select the proper FEC rate.

Referring to FIG. 5, the process begins by processing logic transmitting a new packet (processing block 501). In response to the new packet being transmitted, the process determines whether the new packet is part of a new FEC block (processing block 502). Each FEC block is formed by consecutive source blocks that can be injected in $\Delta_{FEC}$ time units using the most recent transmission rate set by the TFRC protocol plus the parity blocks generated for these source blocks. FEC blocks one after another form a stream of blocks with no gaps and the first and the last block of each FEC block is well-defined given the number of coded source blocks and parity blocks used in each FEC block. If the just transmitted packet is the last block of an FEC block, the next block to be transmitted belongs to the new FEC block and box 402 output will be affirmative (i.e., YES). During the slow start phase where TFRC rate is not high enough, $\Delta_{FEC}$ is typically set to a value such that the number of source blocks to be coded in an FEC block is equal to a pre-defined value. In other words, although the unit of $\Delta_{FEC}$ is in general in time units (such as milliseconds), in the slow start phase the number of blocks can instead be used as the unit. If a packet/block does not signal the start of a new FEC block, processing transitions to processing block 522 where processing logic determines whether the new packet is being transmitted during the slow start ($T_{ss}$) phase. If it is, then $\Delta_{FEC}$ and $r_{FEC}$ are already determined during the processing of the first source block of the current FEC block and the process transitions to processing block 501 where the process is repeated. If it isn't, then processing logic determines whether the new packet is being transmitted during the first data collection ($T_{dq1}$) phase (processing block 523). If it is, again $\Delta_{FEC}$ and $r_{FEC}$ are already determined during the processing of the first source block of the current FEC block and the process transitions to processing block 501 and the process repeats. If not, the process transitions to processing block 509.

If processing logic determines that the new packet is part of a new FEC block, the process transitions to processing block 503 where processing logic determines whether the new packet transmission occurs during the slow start phase. If it does, processing logic uses a predetermined FEC block size and rate (processing block 509) and transitions to processing block 501 where the process repeats. If the new packet transmission does not occur during the $T_{ss}$ phase, the process transitions to processing block 505 where processing logic determines whether the FEC block size is the same or not. If it is the same, processing logic transitions to processing block 507. If it is not the same (e.g., TFRC rate or average RTT did change since the last FEC block size update), processing logic sets the new FEC block size (processing block 506) and transitions to processing block 507.

At processing block 507, processing logic determines whether the new packet transmission occurs during the $T_{dq1}$ phase. If it does, processing logic uses a fixed FEC and rate (processing block 508) and the process transitions to processing block 501 where the process repeats. If the packet does not occur in the $T_{dq1}$ phase, the process transitions to processing block 509.

At processing block 509, processing logic determines whether there is a loss estimate for the current FEC block (processing block 509). If there is not, processing logic sets the FEC rate to zero (processing block 510) and transitions to processing block 501 where the process repeats. If processing logic determines a loss estimate exists, processing logic sets the FEC rate based on the loss estimate report sent by the receiver (processing block 511) and transitions to processing block 501 where the process repeats.

FIG. 6 is a flow diagram of one embodiment of a process to report loss estimates at the receiver as part of a receiver based dynamic FEC process. The process is performed by processing logic that may comprise hardware (e.g., circuitry, dedicated logic, etc.), software (such as is run on a general purpose computer system or a dedicated machine), or a combination of both.

Referring to FIG. 6, the process begins by processing logic receiving a new packet (processing block 601). Processing logic then determines whether the packet is received during the $T_{ss}$ phase (processing block 602). If it is, processing logic transitions to processing block 601 where the process repeats. If not, processing logic determines whether the new packet is received during the $T_{dq1}$ phase (processing block 602). If it is, the process transitions to processing block 601 and the process repeats. If not, processing logic transitions to processing block 604 where processing logic determines whether the new packet occurs in the second data collection ($T_{dq2}$) phase. If it does, processing logic uses FTT thresholding and selects a rate (processing block 605) and then transitions to processing block 606. If not, processing logic sets the derivative of the FTT(i−m), determines the region k (processing block 611), sets the variable j equal to the max loss event in region k (processing block 612) and transitions to processing block 613, where region k is described in FIG. 3A, where the loss events are divided into different compact regions and bound each region is bounded separately using convex hulls.

At processing logic 613, processing logic determines whether the $d_{FTT}=\{FTT, \dot{FTT}\}$ (two tuple that represent the estimates of FTT and derivative of the FTT after receiving the new packet) is within a guard band of the convex hull area of region k for loss event j. Note that j can vary between 1 and the maximum loss event observed so far in region k. Note also that if $d_{FTT}$ belongs to more than one loss event, the largest loss estimate is used, hence the iteration starts from the maximum loss event and processing logic iterates processing block 613 until $d_{FTT}$ is concluded to be of loss type j or j is zero (i.e., it is estimated that any losses based on the most recent {FTT, $\dot{FTT}$} estimate from the newly received packet will not be observed. After the iteration is complete, processing logic sets the FEC rate (processing block 614) with respect to the loss event (i.e., final value of j after the iteration in block 613) and transitions to processing block 606.

At processing block 606, processing logic determines if the FCC rate is greater than or equal to zero. If it is, processing logic sends the loss estimate report to the sender (processing block 608) and transitions to processing block 601 where the process repeats.

An Example of a Computer System

Figure 7:
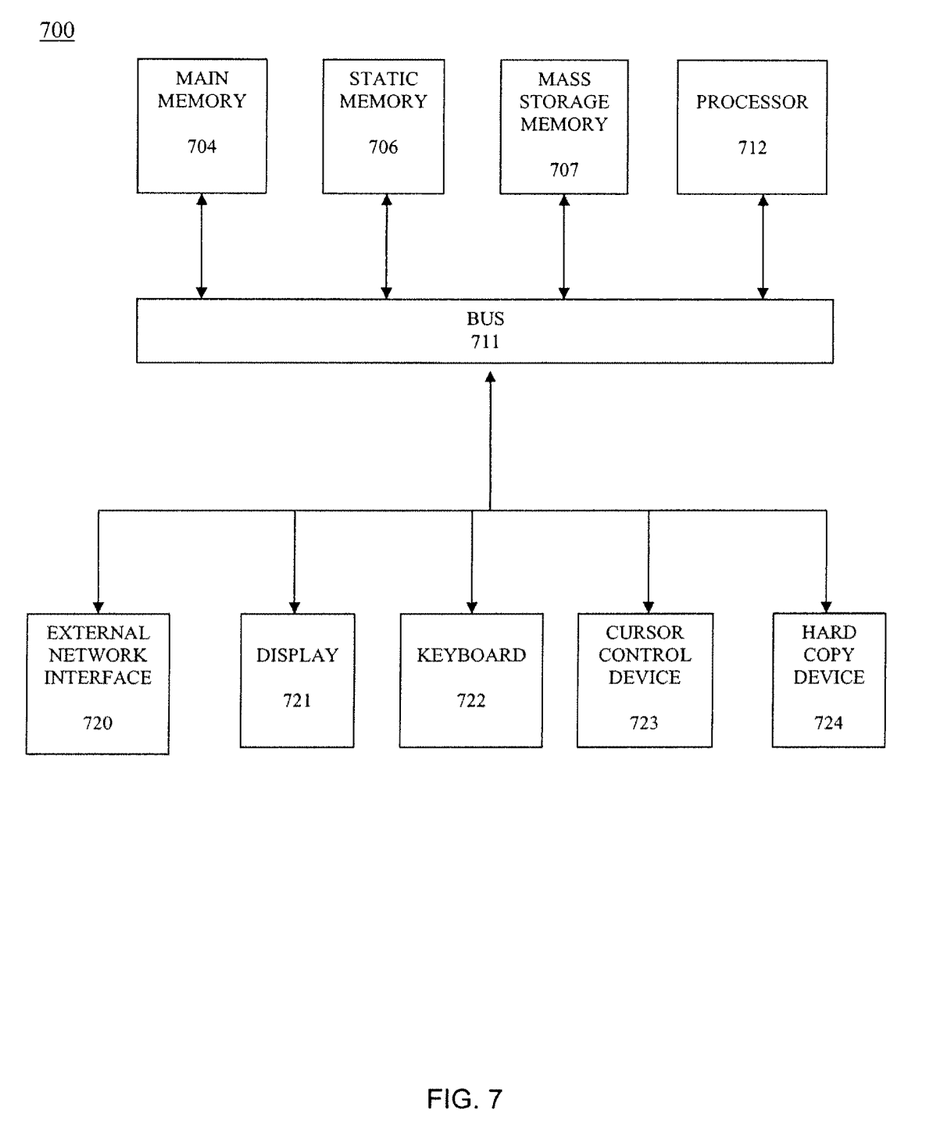
FIG. 7 is a block diagram of an exemplary computer system that may perform one or more of the operations described herein.

FIG. 7 is a block diagram of an exemplary computer system that may perform one or more of the operations described herein. Referring to FIG. 7, computer system 700 may comprise an exemplary client or server computer system. Computer system 700 comprises a communication mechanism or bus 711 for communicating information, and a processor 712 coupled with bus 711 for processing information. Processor 712 includes a microprocessor, but is not limited to a microprocessor, such as, for example, Pentium™, PowerPC™, Alpha™, etc.

System 700 further comprises a random access memory (RAM), or other dynamic storage device 704 (referred to as main memory) coupled to bus 711 for storing information and instructions to be executed by processor 712. Main memory 704 also may be used for storing temporary variables or other intermediate information during execution of instructions by processor 712.

Computer system 700 also comprises a read only memory (ROM) and/or other static storage device 706 coupled to bus 711 for storing static information and instructions for processor 712, and a data storage device 707, such as a magnetic disk or optical disk and its corresponding disk drive. Data storage device 707 is coupled to bus 711 for storing information and instructions.

Computer system 700 may further be coupled to a display device 721, such as a cathode ray tube (CRT) or liquid crystal display (LCD), coupled to bus 711 for displaying information to a computer user. An alphanumeric input device 722, including alphanumeric and other keys, may also be coupled to bus 711 for communicating information and command selections to processor 712. An additional user input device is cursor control 723, such as a mouse, trackball, trackpad, stylus, or cursor direction keys, coupled to bus 711 for communicating direction information and command selections to processor 712, and for controlling cursor movement on display 721.

Another device that may be coupled to bus 711 is hard copy device 724, which may be used for marking information on a medium such as paper, film, or similar types of media. Another device that may be coupled to bus 711 is a wired/wireless communication capability 725 to communication to a phone or handheld palm device.

Note that any or all of the components of system 700 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method to protect media flows against congestion losses, the method comprising:
   measuring congestion by delay samples;
   performing a dynamic Forward Error Correction (FEC) algorithm, including modeling loss events associated with the delay samples using convex hull clustering for loss-event classification, including determining an FEC rate according to the loss-event classification.

2. The method defined in claim 1 wherein performing the dynamic FEC algorithm comprises:
   dividing a time-horizon into FEC frames; and
   determining the FEC rate according to the loss-event classification based on at least one of a group consisting of: (1) a file transfer time (FTT) sample and its derivative and (2) a round trip time (RTT) sample and its derivative.

3. The method defined in claim 1 wherein the loss-event classification is performed by a classifier based on round trip time (RTT) values obtained at a sender.

4. The method defined in claim 1 wherein the loss-event classification is performed by a classifier based on file transfer time (FTT) values obtained at a receiver.

5. A method to protect a media flow against congestion losses, the method comprising:
   measuring congestion by delay samples;
   modeling loss events associated with the delay samples by grouping loss events as unions of convex hulls to identify a period of potentially increased congestion;
   dynamically changing a forward error correction (FEC) rate based on the modeling; and
   applying FEC protection to the media flow during the period based on the FEC rate.

6. The method defined in claim 5 wherein the modeling loss events associated with the delay samples comprises determining whether round trip time (RTT) sequences or file transfer time (FTT) sequences are in an increasing or decreasing region, above or below a threshold, at a local minima.

7. The method defined in claim 6 further comprising classifying loss events based on FTT or RTT derivatives.

8. The method defined in claim 5 wherein modeling loss events associated with the delay samples comprises:
   constructing regions using a convex-hull based clustering algorithm, wherein a union of the regions covers all corresponding loss events.

9. The method defined in claim 8 wherein constructing regions comprises:
   performing cluster separation over a domain; and
   applying convex hull modeling of each separated cluster.

10. The method defined in claim 9 wherein the domain comprises one of a round trip time (RTT) or file transfer time (FTT) domain.

11. The method defined in claim 9 wherein cluster separation is performed using a loss event histogram over the domain.

12. The method defined in claim 1 further comprising:
   receiving a loss event report from a receiver;
   estimating a most recent round trip time (RTT) according to the loss event report; and
   determining the FEC rate according to the loss-event classification based on RTT values.

13. The method defined in claim 12 further comprising:
   during a first phase,
       using a predefined FEC block size and FEC rate;
   during a second phase,
       determining an FEC block size,
       collecting statistics of different loss types and a number of packet drops in an FEC block,
       setting the FEC rate based on RTT delay and loss event maps;
   during a third phase,
       determining different regions and corresponding clusters,
       setting the FEC rate based on a location in a clustering region of a point defined by a most recent RTT and its derivative.

14. The method defined in claim 13 wherein, during the third phase, if a new loss report occurs, then determining in which clustering region a new RTT and its derivative are and setting the FEC rate based on the determination.

15. The method defined in claim 13 wherein, during the second phase, setting the FEC rate is based on RTT thresholding.

16. The method defined in claim 1 further comprising:
during a first phase,
    using a predefined FEC block size and FEC rate;
during a second phase,
    determining an FEC block size,
    collecting pairs containing a file transfer time (FTT) value and its derivative and their corresponding loss events,
    setting an FEC rate based on FTT thresholding;
during a third phase,
    determining different regions and corresponding clusters using a convex hull based algorithm,
    setting the FEC rate, if a loss occurs, based on a location in a clustering region of a point defined by a most recent FTT and its derivative.

17. The method defined in claim 5 wherein the delay samples comprise round trip time (RTT) samples taken at a sender.

18. The method defined in claim 5 wherein the delay samples comprise file transfer time (FTT) samples taken at a receiver.

19. The method defined in claim 5 wherein applying FEC protection to the media flow comprises applying erasure coding during the period.

20. An article of manufacture having one or more non-transitory computer readable storage media storing instructions thereon which when executed by a system cause the system to perform a method to protect media flows against congestion losses, where the method comprises:
    measuring congestion by delay samples;
    performing a dynamic Forward Error Correction (FEC) algorithm, including modeling loss events associated with the delay samples using convex hull clustering for loss-event classification, including determining an FEC rate according to the loss-event classification.

21. The article of manufacture defined in claim 20 wherein performing the dynamic FEC algorithm comprises:
    dividing a time-horizon into FEC frames; and
    determining the FEC rate according to the loss-event classification based on at least one of a group consisting of:
        (1) a file transfer time (FTT) sample and its derivative and (2) an round trip time (RTT) sample and its derivative.

22. The article of manufacture defined in claim 20 wherein the loss-event classification is performed by a classifier based on round trip time (RTT) values obtained at a sender or by a classifier based on file transfer time (FTT) values obtained at a receiver.

23. An apparatus comprising:
    a memory to store delay samples;
    a processor to perform a method to protect media flows against congestion losses, where the method comprises:
    measuring congestion by the delay samples, and
    performing a dynamic Forward Error Correction (FEC) algorithm, including modeling loss events associated with the delay samples using convex hull clustering for loss-event classification, including determining an FEC rate according to the loss-event classification.

24. A method to protect media flows against congestion losses, the method comprising:
    forming convex hull clusters of loss events using past loss events and their file transfer time (FTT) and FTT derivative $\{FTT, \dot{FTT}\}$ estimates, or their round trip time and RTT derivative $\{RTT, \dot{RTT}\}$ estimates; and
    estimating future loss events using most recent $\{FTT, \dot{FTT}\}$ or $\{RTT, \dot{RTT}\}$ estimates and their membership in the convex hull clusters.

25. The method defined in claim 24 further comprising performing loss-event classification using convex hull clustering.

26. The method defined in claim 24 further comprising modeling loss events associated with delay samples by grouping loss events as unions of convex hulls to identify a period of potentially increased congestion.

27. The method defined in claim 26 wherein modeling loss events associated with the delay samples comprises constructing regions using a convex-hull based clustering algorithm, wherein a union of the regions covers all corresponding loss events.

* * * * *